United States Patent [19]
Berneth et al.

[11] Patent Number: 5,580,964
[45] Date of Patent: Dec. 3, 1996

[54] CATIONIC THIADIAZOLE DYESTUFFS

[75] Inventors: Horst Berneth; Uwe Claussen, both of Leverkusen; Werner Hartwich, Köln; Peter Wild, Odenthal, all of Germany

[73] Assignee: Bayer Aktiengesellschaft, Leverkusen, Germany

[21] Appl. No.: 409,374

[22] Filed: Mar. 23, 1995

[30] Foreign Application Priority Data

Mar. 30, 1994 [DE] Germany ............ 44 11 065.0

[51] Int. Cl.$^6$ .................. C09B 44/10; D06P 3/76; D06P 3/32; D21H 21/28
[52] U.S. Cl. ............ 534/607; 534/608; 548/141; 8/437; 8/506; 8/510; 8/655; 8/917; 8/919; 106/22 K
[58] Field of Search ............ 534/607, 608; 548/141; 8/437, 510, 655, 919; 106/22 K

[56] References Cited

U.S. PATENT DOCUMENTS

| | | |
|---|---|---|
| 3,691,148 | 9/1972 | Peter et al. .............. 534/608 |
| 5,208,325 | 5/1993 | Berneth et al. .............. 534/607 |
| 5,328,994 | 7/1994 | Berneth et al. .............. 548/141 X |
| 5,436,323 | 7/1995 | Berneth et al. .............. 534/607 |

FOREIGN PATENT DOCUMENTS

| | | |
|---|---|---|
| 0495250 | 7/1992 | European Pat. Off. . |
| 0579011 | 1/1994 | European Pat. Off. . |
| 4222257 | 1/1994 | Germany . |

*Primary Examiner*—Fiona T. Powers
*Attorney, Agent, or Firm*—Sprung Horn Kramer & Woods

[57] ABSTRACT

Cationic 1,3,4-thiadiazole dyestuffs of the formula

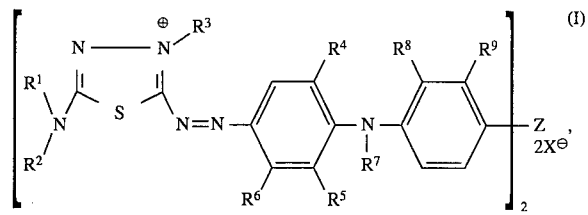

in which the symbols used have the meaning given in the description, corresponding anhydrobases, processes for the preparation of the cationic 1,3,4-thiadiazole dyestuffs, their use for dyeing and printing various materials and as dichroic dyestuffs in polarizing films, and various materials which comprise such dyestuffs.

11 Claims, No Drawings

CATIONIC THIADIAZOLE DYESTUFFS

Cationic 1,3,4-thiadiazole dyestuffs having one thiadiazole group per molecule are already known (see, for example, DE-A 4 222 257). However, the known 1,3,4-thiadiazole dyestuffs have different properties to those according to the invention, which contain two thiadiazole groups per molecule.

The present invention relates to cationic 1,3,4-thiadiazole dyestuffs of the formula (I)

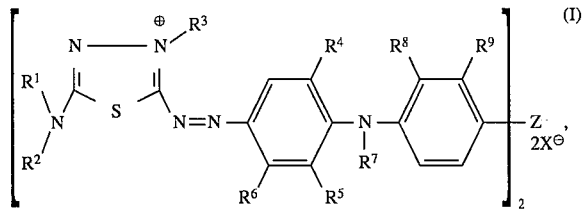

in which $R^1$ and $R^2$ independently of one another represent hydrogen, alkyl, alkenyl, cycloalkyl, aralkyl, aryl or a heterocyclic radical which is optionally bonded via a methylene or ethylene bridge, and wherein $R^1$ and $R^2$, together with the nitrogen atom in between, can also form a heterocyclic radical, $R^3$ represents alkyl, alkenyl, cycloalkyl or aralkyl, $R^4$ and $R^5$ independently of one another represent hydrogen, alkyl, alkoxy or halogen, $R^6$ represents hydrogen, alkyl, alkoxy, aryloxy, arylamino, alkanoylamino, aroylamino, alkanesulphonamino, alkoxycarbonylamino, alkylaminocarbonylamino, halogen, cyano, alkoxycarbonyl or nitro or $R^5$ and $R^6$ form a —CH=CH—CH=CH— bridge, $R^7$ represents hydrogen, alkyl, cycloalkyl, alkenyl, aralkyl or aryl, $R^8$ and $R^9$ independently of one another represent hydrogen, alkyl, alkoxy or halogen, Z denotes a bivalent bridge member and $X^\ominus$ denotes an anion, and wherein all the alkyl, alkenyl, cycloalkyl, aralkyl, aryl, alkoxy and heterocyclic radicals mentioned can be optionally substituted by non-ionic substituents, carboxyl groups, ammonium groups and/or pyridinium groups.

Preferably, at least one of the radicals $R^4$, $R^5$, $R^6$, $R^8$ and $R^9$ is other than hydrogen, or $R^5$ and $R^6$ together form a —CH=CH—CH=CH— bridge.

Non-ionic substituents are, for example, the non-dissociating substituents customary in dyestuffs chemistry, such as cyano, hydroxyl, fluorine, chlorine, bromine, nitro, alkyl, monoalkylamino, dialkylamino, alkoxy, phenyl, acyloxy, acylamino, alkoxycarbonyl and alkoxycarbonyloxy.

Alkyl radicals, including those in alkoxy and aralkyl radicals, are, for example, those having 1 to 8, preferably 1 to 4 C atoms. They can also be branched.

Alkenyl radicals are, for example, those having 2 to 6, preferably 2 to 3 C atoms.

Cycloalkyl radicals are, for example, those having 4 to 7, preferably 5 to 6 C atoms.

Halogen preferably represents fluorine, chlorine or bromine.

Aryl radicals, including those in aralkyl radicals, are preferably phenyl radicals, which can optionally be substituted by 1 to 3 non-ionic substituents and/or a carboxyl group.

Heterocyclic radicals are, for example, thienyl, furyl and pyridyl, and their partly or completely hydrogenated derivatives. They can optionally contain 1 to 3 non-ionic substituents.

Preferred anions $X^\ominus$ are colourless, organic and inorganic anions, for example fluoride, chloride, bromide, iodide, perchlorate, tetrafluoborate, hydroxide, hydrogen sulphate, sulphate, dihydrogenphosphate, hydrogenphosphate, phosphate, bicarbonate, carbonate, methyl-sulphate, ethylsulphate, cyanate, thiocyanate, tri- and tetrachlorozincate, tetrachloroferrate and anions of saturated or unsaturated aliphatic, cycloaliphatic, aromatic or heterocyclic carboxylic and sulphonic acids, such as formate, acetate, hydroxyacetate, cyanoacetate, propionate, hydroxypropionate, oxalate, citrate, lactate, tartrate, the anion of cyclohexanecarboxylic acid, phenylacetate, benzoate, the anion of nicotinic acid, methanesulphonate, ethanesulphonate, benzenesulphonate, chlorobenzenesulphonate and toluenesulphonate, and hexafluorosilicate.

If the anions are polyvalent, for example sulphate or oxalate, $X^\ominus$ in formula (I) represents one equivalent of such a polyvalent anion.

Preferred cationic 1,3,4-thiadiazole dyestuffs of the formula (I) are those in which $R^1$ and $R^2$ independently of one another each represent $C_1$–$C_8$-alkyl, which is optionally substituted by hydroxyl, halogen, cyano, $C_1$–$C_4$-alkoxy, aminocarbonyl and/or $C_1$–$C_4$-alkoxycarbonyl, or represent allyl, cyclopentyl, cyclohexyl or a benzyl, phenethyl or phenyl radical which is optionally substituted by halogen, cyano, $C_1$–$C_4$-alkyl, $C_1$–$C_4$-alkoxy and/or $C_1$–$C_4$-alkanoylamino, or represent tetramethylenesulphonyl, tetrahydrofurylmethyl, pyridylmethyl or pyridylethyl, and wherein $R^2$ can also represent hydrogen, or $R^1$ and $R^2$, together with the nitrogen atom in between, represent a pyrrolidino, piperidino or morpholino radical which is optionally substituted by up to 4 methyl groups or a piperazino radical which is optionally substituted on the nitrogen by methyl, ethyl, hydroxyethyl or aminoethyl, $R^3$ represents $C_1$–$C_4$-alkyl, which is optionally substituted by hydroxyl, halogen, cyano, $C_1$–$C_4$-alkoxy, aminocarbonyl and/or $C_1$–$C_4$-alkoxycarbonyl, or represents allyl or a benzyl or phenethyl radical which is optionally substituted by halogen, $C_1$–$C_4$-alkyl and/or $C_1$–$C_4$-alkoxy, $R^4$ and $R^5$ independently of one another represent hydrogen, $C_1$–$C_4$-alkyl, $C_1$–$C_4$-alkoxy or halogen, $R^6$ represents hydrogen, $C_1$–$C_4$-alkyl, $C_1$–$C_4$-alkoxy, $C_6$–$C_{10}$-aryloxy, $C_6$–$C_{10}$-arylamino, $C_1$–$C_4$-alkanoylamino, $C_6$–$C_{10}$-aroylamino, $C_1$–$C_4$-alkanesulphonylamino, $C_1$–$C_4$-alkoxycarbonylamino, $C_1$–$C_4$-alkylaminocarbonylamino, halogen, cyano, $C_1$–$C_4$-alkoxycarbonyl or nitro, or $R^5$ and $R^6$ form a —CH=CH—CH=CH— bridge, $R^7$ represents hydrogen, $C_1$–$C_4$-alkyl, which is optionally substituted by hydroxyl, halogen, cyano, $C_1$–$C_4$-alkoxy, aminocarbonyl and/or $C_1$–$C_4$-alkoxycarbonyl, allyl, cyclopentyl, cyclohexyl or a benzyl, phenethyl or phenyl radical which is optionally substituted by halogen, $C_1$–$C_4$-alkyl and/or $C_1$–$C_4$-alkoxy, $R^8$ and $R^9$ independently of one another represent hydrogen, $C_1$–$C_4$-alkyl, $C_1$–$C_4$-alkoxy or halogen, Z represents —$(CH_2)_n$—, —$C(CH_3)_2$—, oxygen, sulphur, $NR^{10}$, $SO_2$, —O—$(CH_2)_{n1}$—O—, —OCO—, —OCOO—, —NHCO—, —NHCONH—, —NHCO-CONH—, —NHCOCH=CHCOHN—, —NHSO$_2$—, —NHSO$_2$NH—, —CONHCO—, —CONHNHCO— or a group of the formulae (II) or (III)

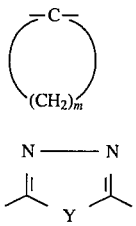

in which n and n$_1$ denote 1, 2, 3 or 4, m denotes 4, 5 or 6,

R$^{10}$ denotes hydrogen or C$_1$–C$_4$-alkyl and

Y denotes oxygen, sulphur or NH, and

X$^\ominus$ denotes an anion.

Other preferred 1,3,4-thiadiazole dyestuffs of the formula (I) are those in which R$^1$ and R$^2$ independently of one another represent methyl, ethyl, propyl, butyl, methylpropyl, pentyl, methylbutyl, dimethylpropyl, hexyl, hydroxyethyl, hydroxypropyl, chloroethyl, cyanomethyl, cyanoethyl, cyanopropyl, methoxyethyl, ethoxyethyl, methoxypropyl, aminocarbonylmethyl, aminocarbonylethyl, methoxycarbonylmethyl, methoxycarbonylethyl, allyl, cyclohexyl, benzyl, phenethyl, methylbenzyl, chlorobenzyl, methoxybenzyl, phenyl, chlorophenyl, methylphenyl, methoxyphenyl, ethoxyphenyl, acetaminophenyl, cyanophenyl, tetramethylenesulphon-3-yl, furfuryl, 2- or 4-pyridylmethyl or 2- or 4-pyridylethyl, and R$^2$ can also denote hydrogen or R$^1$ and R$^2$, together with the nitrogen atom in between, represent pyrrolidino, piperidino, morpholino, piperazino, methylpiperazino, ethylpiperazino, hydroxyethylpiperazino or aminoethylpiperazino, R$^3$ represents methyl, ethyl, propyl, butyl, hydroxyethyl, hydroxypropyl, hydroxybutyl, chloroethyl, cyanomethyl, cyanoethyl, cyanopropyl, methylethyl, ethoxyethyl, methoxypropyl, aminocarbonylethyl, methoxycarbonylethyl, ethoxycarbonylethyl, allyl, benzyl, phenethyl, methylbenzyl, chlorobenzyl or methoxybenzyl, R$^4$ and R$^5$ independently of one another represent hydrogen, methyl, ethyl, methoxy, ethoxy or chlorine, R$^6$ represents hydrogen, methyl, ethyl, methoxy, ethoxy, phenoxy, anilino, formylamino, acetylamino, propionylamino, trifluoroacetylamino, benzoylamino, methanesulphonylamino, ethanesulphonylamino, methoxycarbonylamino, ethoxycarbonylamino, methylaminocarbonylamino, ethylaminocarbonylamino, propylaminocarbonylamino, butylaminocarbonylamino, fluorine, chlorine, bromine, cyano, methoxycarbonyl, ethoxycarbonyl or nitro or R$^5$ and R$^6$ form a —CH=CH—CH=CH— bridge, R$^7$ represents hydrogen, methyl, ethyl, propyl, butyl, hydroxyethyl, hydroxypropyl, chloroethyl, cyanomethyl, cyanoethyl, cyanopropyl, methoxyethyl, ethoxyethyl, aminocarbonylethyl, methoxycarbonylethyl, ethoxycarbonylethyl, allyl, benzyl, phenethyl, methylbenzyl, phenyl, chlorophenyl, methylphenyl or methoxyphenyl, R$^8$ and R$^9$ independently of one another represent hydrogen, methyl, methoxy or chlorine, Z represents —CH$_2$—, —CH$_2$CH$_2$—, C(CH$_3$)$_2$—, oxygen, NH, SO$_2$, —O(CH$_2$)$_2$—O—, —NHCO—, —NHCONH—, —NHCOCH=CHCONH—, —NHSO$_2$—, —CONHNHCO— or the group of the formula (II) where m=5 or the group of the formula (III) where Y=oxygen and X$^-$ denotes an anion.

Particularly preferred cationic 1,3,4-thiadiazole dyestuffs of the formula (I) are those in which R$^1$ and R$^2$ independently of one another represent methyl, ethyl, propyl, butyl, hydroxyethyl, hydroxypropyl, cyanoethyl, methoxyethyl, ethoxyethyl, methoxyphenyl or acetaminophenyl, and R$^2$ can also denote hydrogen or R$^1$ and R$^2$, together with the nitrogen atom in between, represent morpholino, R$^3$ represents methyl, ethyl, hydroxyethyl, hydroxypropyl, cyanoethyl or aminocarbonylethyl, R$^4$ represents methyl, methoxy, ethoxy or chlorine, R$^5$, R$^8$ and R$^9$ represent hydrogen, R$^6$ represents hydrogen, methyl, methoxy, formylamino, acetylamino, chlorine or cyano, R$^7$ represents hydrogen, methyl, hydroxyethyl, hydroxypropyl or cyanoethyl, Z represents NH, SO$_2$, —NHCO—, —NHCONH— or the group of the formula (III) where Y=oxygen and X$^-$ denotes an anion.

Especially preferred cationic 1,3,4-thiadiazole dyestuffs of the formula (I) are those in which R$^7$ represents hydrogen and all the other radicals have the meaning given immediately above.

The present invention furthermore relates to anhydrobases of the formula (IV)

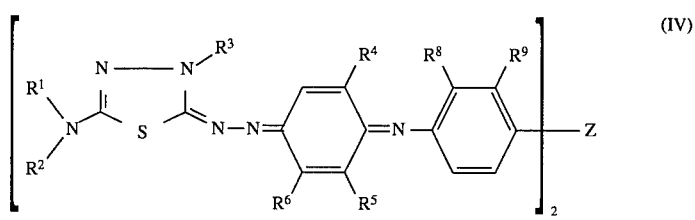

in which R$^1$ to R$^6$, R$^8$, R$^9$ and Z have the broadest meaning given for formula (I).

The anhydrobases of the formula (IV) can be obtained from the dyestuffs of the formula (I) by reaction with bases in the presence of a solvent.

Bases which are suitable for this are, for example, hydroxides, such as sodium hydroxide, potassium hydroxide and calcium hydroxide, oxides, such as magnesium oxide, alcoholates, such as sodium methylate, ethylate and tertbutylate, amines, such as triethylamine, di- or triethanolamine, piperidine or pyridine, or basic ion exchangers based on styrene/divinylbenzene.

Suitable solvents are, for example, water, alcohols, such as methanol, ethanol, isopropanol or glycols, ketones, such as acetone or butanone, esters and lactones, such as ethyl acetate or γ-butyrolactone, ethers, such as methyl tertbutyl ether, amides, such as dimethylformamide, dimethylacetamide, N-methyl-pyrrolidone or N-methylcaprolactam, nitriles, such as acetonitrile and 3-hydroxypropionitrile, sulphoxides, such as dimethylsulphoxide, sulphones, such as sulpholane and dimethyl sulphone, or mixtures thereof.

The anhydrobases of the formula (IV) are suitable intermediate products for the preparation of dyestuffs of the formula (I), in which $R^7$ denotes hydrogen, having those anions $X^\ominus$ which cannot be introduced or can be introduced only at great expense by one of the preparation processes described below for dyestuffs of the formula (I). Dyestuffs of the formula (I) which acquire particular properties by varying the anion $X^\ominus$, for example better solubility and/or better suitability for the preparation of liquid formulations, can thus be prepared. For this, anhydrobases of the formula (IV) can be reacted with the acid of the formula HX, the anion of which is to be introduced. If appropriate, the reaction can be carried out in the presence of a solvent and while cooling, at room temperature or at temperatures up to the boiling point of the medium.

Solvents for this reaction can be, for example, an excess of the acid HX, water, glycols, such as ethylene glycol or propylene glycol, amides, such as ε-caprolactam, nitriles, such as oxypropionitrile, the solvents listed above for the preparation of the anhydrobases, or mixtures thereof.

Dyestuffs of the formula (I) thus prepared either precipitate out of the reaction mixture or give a stable solution therein.

The present invention also relates to a process for the preparation of cationic 1,3,4-thiadiazole dyestuffs of the formula (I), which is characterized in that diazotized 2-amino-1,3,4-thiadiazoles of the formula (V)

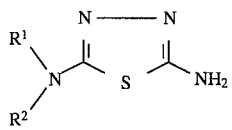
(V)

in which $R^1$ and $R^2$ have the broadest meaning given for formula (I), are coupled to diphenylamine derivatives of the formula (VI)

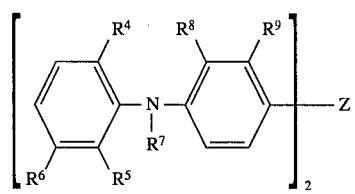
(VI)

in which $R^4$ to $R^9$ and Z have the broadest meaning given for formula (I), and the products are then quaternized with compounds of the formula (VII)

$$R^3X \quad (VII)$$

in which $R^3$ has the broadest meaning given for formula (I) and

X represents a group which corresponds to the non-charged anion $X^\ominus$ as given for formula (I).

The 2-amino-1,3,4-thiadiazoles of the formula (V) are known, for example, from DE-A 2 811 258 or are obtainable in an analogous manner. The diphenylamine derivatives of the formula (VI) are known, for example, from Houben-Weyl, Methoden der organischen Chemie (Methods of Organic Chemistry), Volume XI/1, page 63 et seq., or are obtainable in an analogous manner.

Another process for the preparation of cationic 1,3,4-thiadiazole dyestuffs of the formula (I) is characterized in that dyestuffs of the formula (VIII)

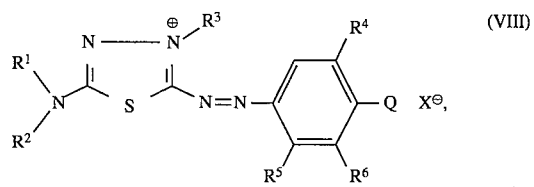
(VIII)

in which $R^1$ to $R^6$ and X have the broadest meaning given for formula (I) and Q represents halogen, hydroxyl, alkoxy, cycloalkoxy, aryloxy, amino, mono- or dialkylamino, acyloxy or acylamino, are reacted with amines of the formula (IX)

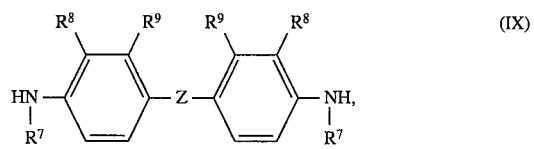
(IX)

in which $R^7$ to $R^9$ and Z have the broadest meaning given for formula (I).

In the formula (VIII), Q preferably represents fluorine, chlorine, bromine, hydroxyl, $C_1$–$C_4$-alkoxy, $C_5$–$C_7$-cycloalkoxy, $C_6$–$C_{10}$-aryloxy, NR'R'', wherein R' and R'' independently of one another represent hydrogen or $C_1$–$C_6$-alkyl, $C_1$–$C_6$-alkanoyloxy, $C_6$–$C_{10}$-aroyloxy, $C_1$–$C_6$-alkanesulphonyloxy, $C_6$–$C_{10}$-arylsulphonyloxy, $C_1$–$C_6$-alkanoylamino, $C_6$–$C_{10}$-aroylamino, $C_1$–$C_6$-alkylsulphonylamino or $C_6$–$C_{10}$-arylsulphonylamino.

Compounds of the formula (VIII) can be obtained, for example, by diazotizing 2-amino-1,3,4-thiadiazoles of the formula (V) and coupling the product to a benzene derivative of the formula (X)

(X)

in which $R^4$ to $R^6$ have the broadest meaning given for formula (I) and

Q has the broadest meaning given for formula (VIII), and, if appropriate, if Q represents hydroxyl or amino, acylating the product with $C_1$–$C_6$-aliphatic or $C_6$–$C_{10}$-aromatic carboxylic acid anhydrides or chlorides or sulphonic acid chlorides, and then quaternizing the product with compounds of the formula (VIII).

The diazotizations mentioned can be carried out in a manner known per se, for example with nitrosylsulphuric acid in 80 to 90% strength by weight phosphoric acid or in mixtures of such phosphoric acids with acetic acid, propionic acid and/or sulphuric acid, or with sodium nitrite in aqueous mineral acid, for example hydrochloric acid.

The couplings mentioned can likewise be carried out in a manner known per se, for example in an acid medium, which can be aqueous or aqueous-organic.

The diazotizations and couplings can also be carried out simultaneously by other processes known per se, for example by reacting compounds of the formula (V) and compounds of the formula (VI) or (X) with, for example, sodium nitrite together in an acid medium. Suitable acid media are, for example, aqueous mineral acids or organic acids and mixtures thereof, possible mineral acids being, for example, hydrochloric acid, sulphuric acid or phosphoric acid and possible organic acids being, for example, formic acid, acetic acid or propionic acid. Carbon dioxide liquefied under pressure can also serve as the acid medium.

Possible quaternizing agents are those of the formula (VII) and those which formally give compounds of the formula (VII) under the reaction conditions. Examples are alkyl halides, halogenoacetamides, β-halogenopropionitriles, halogenohydrins, alkylene oxides, alkyl esters of sulphuric acid, alkyl esters of organic sulphonic acids, nitriles, amides and esters of α,β-unsaturated carboxylic acids, alkoxyalkyl halides and vinylpyridines. Individual examples which may be mentioned are: methyl chloride, methyl bromide, methyl iodide, benzyl chloride, benzyl bromide, chloroacetamide, β-chloropropionitrile, ethylenechlorohydrin, dimethyl sulphate, diethyl sulphate, methyl benzenesulphonate, ethyl benzenesulphonate, benzyl benzenesulphonate, methyl toluenesulphonate, ethyl toluenesulphonate, propyl toluenesulphonate, allyl chloride, allyl bromide, ethylene oxide, propylene oxide, acrylonitrile, acrylic acid, acrylamide, methyl acrylate, 2- and 4-vinylpyridine, sulpholene (=1,1-dioxo-2,5-dihydrothiophene), epichlorohydrin, styrene oxide, methylphosphonic acid dimethyl ester and allylphosphoric acid esters.

The quaternizations mentioned can be carried out, for example, in an inert organic solvent, in water or in mixtures thereof, it being possible, if appropriate, for acid-binding agents, such as magnesium oxide, sodium carbonate, sodium bicarbonate, calcium carbonate or sodium acetate, to be added. Suitable organic solvents are, for example, hydrocarbons, chlorohydrocarbons, nitrohydrocarbons, nitriles, esters, ethers, amides, carboxylic acids, carboxylic acid anhydrides, ketones and dialkyl sulphoxides, such as benzene, toluene, tetrachloroethane, mono- and dichlorobenzene, nitrobenzene, acetonitrile, propionitrile, ethyl acetate, γ-butyrolactone, methyl tert-butyl ether, dimethylformamide, N-methylpyrrolidone, acetic acid, propionic acid, lactic acid, acetic anhydride, acetone, butanone and dimethylsulphoxide. The reaction of the dyestuffs of the formula (VIII) with amines of the formula (IX) can likewise be carried out in organic solvents, in water or in mixtures thereof. Suitable solvents are those described above. The reaction can be carried out at temperatures, for example, between 0° and 100° C., preferably those between 10° and 50° C.

The dyestuffs of the formula (I) formed are either precipitated out of the solvents directly and can be isolated, for example, by filtration, or, if water-miscible solvents are used, they can be obtained as solid products which can be filtered off by dilution with water and addition of water-soluble salts, such as sodium chloride or potassium chloride, if appropriate in the presence of zinc chloride.

If "the broadest meaning given for formula (I)" is referred to in the above in the explanation of symbols contained in the formulae, the general meaning of the particular symbol is meant. The preferred, particularly preferred and especially preferred meanings of the particular symbol are then likewise given as for formula (I).

The dyestuffs of the formula (I) according to the invention are outstandingly suitable for dyeing and printing cationically dyeable fibres and fabrics, preferably paper, and for spin dyeing polymers and copolymers of acrylonitrile and dicyanoethylene, fast colour shades being achieved. The dyestuffs can also be used for dyeing and printing tannin-treated cellulose materials, silk and leather. They are furthermore suitable for the preparation of writing liquids, stamping liquids, ball-point pen pastes and ink jet inks, and can also be used in offset printing.

Paper is dyed, for example, in the aqueous slurry of cellulose fibres before and during feeding to the paper machine under acid to neutral conditions in the presence or absence of organic and/or inorganic sizing agents and if appropriate in the presence of other auxiliaries for paper production, for example retention and/or wet strength agents.

Spin dyeing of polyacrylonitrile is carried out, for example, by addition of the dyestuffs of the formula (I) according to the invention to the solution of polyacrylonitrile, which can be spun dry or wet in a known manner.

The dyeings of the dyestuffs of the formula (I) according to the invention on paper are distinguished by good fastnesses to light and wet processing and by a high affinity for the fibre, which leads, in particular, to scarcely coloured or only slightly coloured waste waters.

The dyeings on polyacrylonitrile are likewise distinguished by good fastnesses to light, wet processing, rubbing and steaming.

The dyestuffs of the formula (I) according to the invention are likewise suitable as dichroic dyestuffs for use in polarizing films.

Films based on polyvinyl alcohol which comprise iodine or dichroic dyestuffs as polarizing agents are known (for example M. M. Zwick, J. Appl. Polym. Sci., 9, 2393–2424 (1965), Nippon Kayaku JA 59-145 255, 60-156 759, 60-168 743). Such films absorb light of one direction of polarization, while they allow light in the direction perpendicular thereto to pass through. The highest possible quotient of extinction in these two directions is important. The highest possible colour density in the absorbing state is furthermore required. A process for the production of such films which comprise dichroic dyestuffs is known from EP-A 531 568.

The dyestuffs of the formula (I) according to the invention have a high molar extinction coefficient and are thus superior to dichroic dyestuffs based on azo dyestuffs.

The dyestuffs according to the invention can be used individually, in mixtures with one another or in mixtures with other dyestuffs.

Finally, the present invention also relates to cationically dyeable fibres and fabric, tannin-treated cellulose materials, paper, silk and leather, in particular paper, fibres and fabric which comprise polyacrylonitrile, and polarizing films, which are characterized in that they comprise at least one cationic 1,3,4-thiadiazole dyestuff of the formula (I).

EXAMPLES

Example 1

45.9 g of 3,4-dimethoxyaniline were stirred in 500 ml of glacial acetic acid with 28.4 ml of acetic anhydride at room temperature for 30 minutes. 76.4 g of the 2-amino-1,3,4-thiadiazole of the formula (V) where $R^1=R^2=$2-hydroxypropyl and 49.2 ml of 48% strength by weight aqueous sulphuric acid were added at 5° to 10° C. 55.8 ml of 34.5% strength by weight aqueous sodium nitrite solution were added dropwise at 5° C. in the course of 75 minutes. The mixture was stirred overnight at room temperature. It was brought to pH=2 with 40 ml of 30% strength by weight aqueous sodium hydroxide solution. 55.9 ml of dimethyl sulphate were added dropwise at 35° to 40° C. in the course of 4 hours, the pH being kept at 1.5 to 2 by metering in a total of 20 ml of 30% strength by weight aqueous sodium hydroxide solution. The mixture was diluted with 250 ml of water, and 50 ml of 30% strength by weight aqueous sodium hydroxide solution were added. The mixture was stirred at room temperature for 2 hours. 44.7 g of the amine of the formula (IX) where $R^7=R^8=R^9=$hydrogen and Z=NH, as the sulphuric acid salt, were added. The mixture was stirred at 35° C. and pH=2.3 for 2 hours. 540 ml of concentrated aqueous sodium chloride solution were added and the dyestuff was filtered off with suction. It was rinsed with 1200 ml of 10% strength by weight aqueous sodium chloride solution and dried in vacuo. 57 g of the dyestuff of the formula (I) where $R^1=R^2=$2-hydroxypropyl, $R^3=$methyl, $R^4=$methoxy, $R^6=$acetamino, $R^5=R^7=R^9=$hydrogen, Z=NH and $X^-=$chloride were obtained.

The dyestuff had an absorption maximum in methanol/ glacial acetic acid 9/1 at 645 nm and dyed wood-free paper in a slightly greenish-tinged blue with good fastnesses to light and wet processing.

Example 2

4.2 g of the 2-amino-1,3,4-thiadiazole of the formula (V) where $R^1=R^2=$2-hydroxypropyl were dissolved in a mixture of 40 ml of glacial acetic acid, 10 ml of 85% strength phosphoric acid and 5 ml of 48% strength sulphuric acid. 3.6 ml of 5 molar aqueous sodium nitrite solution were slowly added dropwise at 4° C. After 30 minutes, this diazonium salt solution was added to a solution of 4.0 g of the diphenylamine derivative of the formula (VI) where $R^4$ to $R^9=$hydrogen and Z=trans—CO—CH=CH—CO— in a mixture of 50 ml of glacial acetic acid and 50 ml of 85% strength phosphoric acid. After the mixture had been stirred overnight, it was poured onto ice and the dyestuff was filtered off with suction and washed neutral. After drying, 5.6 g (67% of theory) of the dyestuff of the formula (XI) were obtained.

5.5 g of the dyestuff of the formula (XI) were dissolved in 60 ml of glacial acetic acid. 1.2 ml of dimethyl sulphate were added at 35° C. and the mixture was stirred overnight at 40° C. 0.5 g of sodium acetate and 0.6 ml of dimethyl sulphate were added and the mixture was stirred overnight again at this temperature. It was diluted with 200 ml of water and the dyestuff was precipitated with concentrated aqueous sodium chloride solution. The product was filtered off with suction and dried. 6.4 g (84% of theory) of the dyestuff of the formula (I) where $R^1=R^2=$2-hydroxypropyl, $R^3=$methyl, $R^4$ to $R^9=$hydrogen, Z=trans—CO—CH=CH—CO— and $X^-=$chloride were obtained.

The dyestuff had an absorption maximum in methanol/ glacial acetic acid 9/1 at 617 nm and dyed wood-free paper in a greenish-tinged blue.

The diphenylamine derivative of the formula (VI) employed was prepared as follows:

8 g of fumaric acid dichloride were added dropwise to a solution of 18.4 g of 4-aminodiphenylamine in 200 ml of ethylene chloride. The mixture was stirred overnight at the reflux temperature, cooled and filtered with suction. The product was stirred in 500 ml of 10% strength aqueous sodium carbonate solution, filtered off with suction, washed with water and dried. 21.0 g of the diphenylamine derivative of the formula (VI) where $R^4$ to $R^9=$hydrogen and Z=trans—CO—CH=CH—CO— were obtained.

The FAB mass spectrum showed the masses m/e=449 ($M^++H$) and m/e=447 ($M^+–H$).

Examples 3 to 40

Other dyestuffs of the formula (I) were prepared analogously to Examples 1 and 2. The substitution patterns and, where determined, the $\lambda_{max}$ values can be seen from the following table.

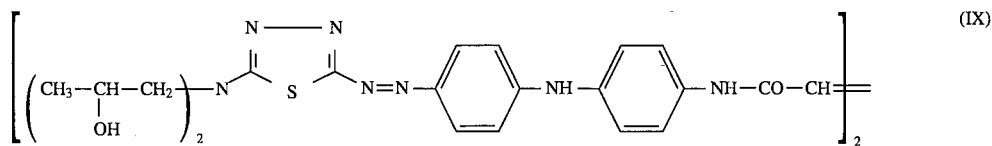

(IX)

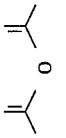

TABLE-continued

| Ex. No. | R¹ | R² | R³ | R⁴ | R⁵ | R⁶ | R⁷ | R⁸ | R⁹ | Z | X | λmax/colour shade | analogously to Ex. No. |
|---|---|---|---|---|---|---|---|---|---|---|---|---|---|
| 20 | CH₃ | CH₃ | CH₂CH=CH₂ | OCH₃ | OCH₃ | H | H | " | CH₃ | NHSO₂NH | ZnCl₃ | | 1 |
| 21 | 4-CH₃O-C₆H₄ | H | CH₂CH(CONH₂) | H | H | H | " | " | H | NHCOCONH | Cl | | 2 |
| 22 | 4-CH₃-C₆H₄-CH₂ | CH₃ | CH₃ | Cl | " | " | C₂H₅ | CH₃ | " | NHCONH | Cl | | 2 |
| 23 | CH₂CH₂CN | CH₂CH₂OH | C₂H₅ | OCH₃ | " | NHSO₂CH₃ | H | H | " | CONHNHCO | ZnCl₃ | | 1 |
| 24 | —CH₂CH₂OCH₂CH₂— | | CH₂COOC₂H₅ | OCH₃ | H | F | H | H | H | —C(CH₃)₂— | Cl | | 1 |
| 25 | CH₂CH(OH)CH₃ | CH₂CH(OH)CH₃ | CH₃ | " | " | COOCH₃ | " | " | " | CH₂OCH₂ | CH₃OSO₃ | | 1 |
| 26 | C₂H₅ | C₂H₅ | C₆H₅-CH₂ | " | " | NHCONHCH₃ | CH₃ | " | " | NHSO₂ | Br | | 1 |
| 27 | " | " | C₆H₅-CH₂CH₂ | H | " | H | H | Cl | " | CONHCO | Cl | | 2 |
| 28 | 4-CH₃-NHCOCH₃-C₆H₄ | H | CH₃ | OC₂H₅ | " | Cl | C₆H₅-CH₂ | H | " | 1,1-dimethylcyclohexyl | CH₃OSO₃ | | 1 |
| 29 | CH₂CH=CH₂ | CH₃ | CH₂CH₂Cl | OCH₃ | " | CN | " | " | " | NHCONH | Cl | | 1 |

TABLE-continued

| Ex. No. | $R^1$ | $R^2$ | $R^3$ | $R^4$ | $R^5$ | $R^6$ | $R^7$ | $R^8$ | $R^9$ | Z | X | $\lambda_{max}$/ colour shade | analogously to Ex. No. |
|---|---|---|---|---|---|---|---|---|---|---|---|---|---|
| 30 | —(CH$_2$)$_5$— | | CH$_3$ | H | H | H | 4-Cl-C$_6$H$_4$ | H | H | CH$_2$ | Cl | | 2 |
| 31 | CH(CH$_3$)$_2$ | CH(CH$_3$)$_2$ | CH$_2$CN | OCH$_3$ | H | —CH=CH—CH=CH— | H | CH$_3$ | H | NH | Cl | | 1 |
| 32 | CH$_2$CH$_2$OH | CH$_2$CH$_2$OH | CH$_3$ | H | | | CH$_3$ | H | " | OCOO | ZnCl$_3$ | | 1 |
| 33 | 4-CH$_3$-C$_6$H$_4$-CH$_2$ | CH$_2$CH$_2$OCH$_3$ | " | OCH$_3$ | H | OCH$_3$ | H | " | " | SO$_2$ | CH$_3$OSO$_3$ | | 1 |
| 34 | tetrahydrothiophene-SO$_2$ | H | CH$_3$ | CH$_3$ | CH$_3$ | H | H | " | " | NHCONH | ZnCl$_3$ | | 2 |
| 35 | | —CH$_2$CH$_2$NCH$_2$CH$_2$— $\|$ CH$_2$CH$_2$OH | " | OC$_2$H$_5$ | H | C$_6$H$_5$-NHCO | " | " | " | O | Cl | | 1 |
| 36 | CH$_2$CH$_2$CONH$_2$ | CH$_3$ | C$_2$H$_5$ | H | " | H | CH$_2$CH$_2$OH | Cl | " | NHCOCONH | Br | | 2 |
| 37 | CH$_2$CH$_2$OCH$_3$ | CH$_2$CH$_2$OCH$_3$ | | Cl | " | " | H | H | " | CO—O—CO | " | | 2 |
| 38 | CH$_3$ | CH$_2$CH$_2$CN | C$_6$H$_5$-CH$_2$ | OCH$_3$ | " | NHSO$_2$C$_2$H$_5$ | " | H | " | NHCO | Br | | 1 |
| 39 | CH$_2$CHCH$_3$ $\|$ OH | CH$_2$CHCH$_3$ $\|$ OH | CH$_3$ | " | " | NHCOCH$_3$ | CH$_3$ | " | " | N=C(CH$_3$)—O—C(CH$_3$)=N | Cl | | 1 |
| 40 | —(CH$_2$)$_4$— | | CH$_2$CH$_2$-C$_6$H$_5$ | " | " | NHCOOC$_2$H$_5$ | H | " | " | NHCONH | Cl | | 1 |

Example 41

Dyeing of Paper 5 g of a mixture of 70% by weight birchwood sulphate pulp and 30% by weight bleached pinewood sulphate pulp were beaten to 30° to 40° SR in 395 ml of water in a laboratory Holländer. This mixture was topped up to 1 l with water. A solution of 25 ml of the dyestuff of Example 1 in 2.5 ml of water, 10 ml of a 1% strength by weight aqueous solution of rosin size Dynacoll VS 50 from Akzo Chemie, D üren, and 15 ml of a 1% strength by weight aqueous solution of aluminium sulphate were added, the mixture being stirred for 8 minutes between the additions. The dyed and sized paper pulp was fed to a laboratory sheet-forming machine, spread uniformly and sucked off. The sheet of paper, which had been dyed slightly greenish-tinged blue, was then pressed between filter paper and dried.

8% of the dyestuff employed were detected by absorption spectroscopy in the papermaking waste water. The fastness to light and the fastnesses to water, alcohol, sodium carbonate solution and acetic acid were good.

The dyestuffs of Examples 2 to 40 were employed completely analogously.

Example 42

Production of a Polarizing Film

2% of the dyestuff of Example 16, 2.5% of glycerol and 5% of methanol were dissolved in an 8% strength by weight aqueous polyvinyl alcohol solution (these percentage data are based on the polyvinyl alcohol). This solution was applied to a glass plate in a layer thickness of 500 μm using a laboratory doctor blade, and was dried. The layer was then detached and stretched with a laboratory stretching machine. The stretching temperature was 180° C., the residence time was 5 minutes, the stretching rate was 100 mm/minute and the degree of stretching was 595%. The stretched film had a thickness of 15.5 μm and a width of 30.2 mm.

The dichroism as the quotient of the extinction in the stretching direction of the film and the extinction perpendicular thereto was determined as 3 at 600 nm and as 3.6 at 700 nm.

The dyestuffs of Examples 1 to 15 and 17 to 40 were employed completely analogously.

What is claimed is:

1. A cationic 1,3,4-thiadiazole dyestuff of the formula

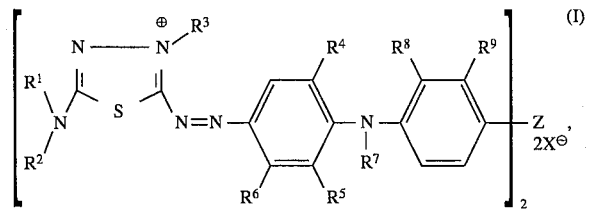

in which
R$^1$ and R$^2$ independently of one another represent hydrogen, alkyl, alkenyl, cycloalkyl, aralkyl, aryl or a heterocyclic radical which is optionally bonded via a methylene or ethylene bridge,
and wherein R$^1$ and R$^2$, together with the nitrogen atom in between, can also form a heterocyclic radical,
R$^3$ represents alkyl, alkenyl, cycloalkyl or aralkyl,
R$^4$ and R$^5$ independently of one another represent hydrogen, alkyl, alkoxy or halogen,
R$^6$ represents hydrogen, alkyl, alkoxy, aryloxy, arylamino, alkanoylamino, aroylamino, alkanesulphonamino, alkoxycarbonylamino, alkylaminocarbonylamino, halogen, cyano, alkoxycarbonyl or nitro
or
R$^5$ and R$^6$ form a —CH=CH—CH=CH— bridge,
R$^7$ represents hydrogen, alkyl, cycloalkyl, alkenyl, aralkyl or aryl,
R$^8$ and R$^9$ independently of one another represent hydrogen, alkyl, alkoxy or halogen,
Z denotes a bivalent bridge member and
X$^\ominus$ denotes an anion,
and wherein all the alkyl, alkenyl, cycloalkyl, aralkyl, aryl, alkoxy and heterocyclic radicals mentioned can be optionally substituted by non-ionic substituents, carboxyl groups, ammonium groups and/or pyridinium groups.

2. A cationic 1,3,4-thiadiazole dyestuff according to claim 1, in which
R$^1$ and R$^2$ independently of one another each represent C$_1$–C$_8$-alkyl, which is optionally substituted by hydroxyl, halogen, cyano, C$_1$–C$_4$-alkoxy, aminocarbonyl and/or C$_1$–C$_4$-alkoxycarbonyl, or represent allyl, cyclopentyl, cyclohexyl or a benzyl, phenethyl or phenyl radical which is optionally substituted by halogen, cyano, C$_1$–C$_4$-alkyl, C$_1$–C$_4$-alkoxy and/or C$_1$–C$_4$-alkanoylamino, or represent tetramethylenesulphonyl, tetrahydrofurylmethyl, pyridylmethyl or pyridylethyl, and wherein R$^2$ can also represent hydrogen,
or
R$^1$ and R$^2$, together with the nitrogen atom in between, represent a pyrrolidino, piperidino or morpholino radical which is optionally substituted by up to 4 methyl groups or a piperazino radical which is optionally substituted on the nitrogen by methyl, ethyl, hydroxyethyl or aminoethyl,
R$^3$ represents C$_1$–C$_4$-alkyl, which is optionally substituted by hydroxyl, halogen, cyano, C$_1$–C$_4$-alkoxy, aminocarbonyl and/or C$_1$–C$_4$-alkoxycarbonyl, or represents allyl or a benzyl or phenethyl radical which is optionally substituted by halogen, C$_1$–C$_4$-alkyl and/or C$_1$–C$_4$-alkoxy,
R$^4$ and R$^5$ independently of one another represent hydrogen, C$_1$–C$_4$-alkyl, C$_1$–C$_4$-alkoxy or halogen,
R$^6$ represents hydrogen, C$_1$–C$_4$-alkyl, C$_1$–C$_4$-alkoxy, C$_6$–C$_{10}$-aryloxy, C$_6$–C$_{10}$-arylamino, C$_1$–C$_4$-alkanoylamino, C$_6$–C$_{10}$-aroylamino, C$_1$–C$_4$-alkanesulphonylamino, C$_1$–C$_4$-alkoxycarbonylamino, C$_1$–C$_4$-alkylaminocarbonylamino, halogen, cyano, C$_1$–C$_4$-alkoxycarbonyl or nitro,
or
R$^5$ and R$^6$ form a —CH=CH—CH=CH— bridge,
R$^7$ represents hydrogen, C$_1$–C$_4$-alkyl, which is optionally substituted by hydroxyl, halogen, cyano, C$_1$–C$_4$-alkoxy, aminocarbonyl and/or C$_1$–C$_4$-alkoxycarbonyl, allyl, cyclopentyl, cyclohexyl or a benzyl, phenethyl or phenyl radical which is optionally substituted by halogen, C$_1$–C$_4$-alkyl and/or C$_1$–C$_4$-alkoxy,
R$^8$ and R$^9$ independently of one another represent hydrogen, C$_1$–C$_4$-alkyl, C$_1$–C$_4$-alkoxy or halogen,
Z represents —(CH$_2$)$_n$—, —C(CH$_3$)$_2$—, oxygen, sulphur, NR$^{10}$, SO$_2$, —O—(CH$_2$)$_{n1}$—O—, —OCO—, —OCOO—, —NHCO—, —NHCONH—, —NHCO—CONH—, —NHCOCH=CHCONH—, —NHSO$_2$—, —NHSO$_2$NH—, —CONHCO—, —CONHNHCO— or a group of the formulae (II) or (III)

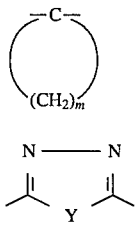

in which n and n$_1$ denote 1, 2, 3 or 4, m denotes 4, 5 or 6,

R$^{10}$ denotes hydrogen or C$_1$–C$_4$-alkyl and

Y denotes oxygen, sulphur or NH, and

X$^\ominus$ denotes an anion.

3. A cationic 1,3,4-thiadiazole dyestuff according to claim 1 in which,

R$^1$ and R$^2$ independently of one another represent methyl, ethyl, propyl, butyl, methylpropyl, pentyl, methylbutyl, dimethylpropyl, hexyl, hydroxyethyl, hydroxypropyl, chloroethyl, cyanomethyl, cyanoethyl, cyanopropyl, methoxyethyl, ethoxyethyl, methoxypropyl, aminocarbonylmethyl, aminocarbonylethyl, methoxycarbonylmethyl, methoxycarbonylethyl, allyl, cyclohexyl, benzyl, phenethyl, methylbenzyl, chlorobenzyl, methoxybenzyl, phenyl, chlorophenyl, methylphenyl, methoxyphenyl, ethoxyphenyl, acetaminophenyl, cyanophenyl, tetramethylenesulphon-3-yl, furfuryl, 2- or 4-pyridylmethyl or 2- or 4-pyridylethyl, and R$^2$ can also denote hydrogen or R$^1$ and R$^2$, together with the nitrogen atom in between, represent pyrrolidino, piperidino, morpholino, piperazino, methylpiperazino, ethylpiperazino, hydroxyethylpiperazino or aminoethylpiperazino, R$^3$ represents methyl, ethyl, propyl, butyl, hydroxyethyl, hydroxypropyl, hydroxybutyl, chloroethyl, cyanomethyl, cyanoethyl, cyanopropyl, methylethyl, ethoxyethyl, methoxypropyl, aminocarbonylethyl, methoxycarbonylethyl, ethoxycarbonylethyl, allyl, benzyl, phenethyl, methylbenzyl, chlorobenzyl or methoxybenzyl, R$^4$ and R$^5$ independently of one another represent hydrogen, methyl, ethyl, methoxy, ethoxy or chlorine, R$^6$ represents hydrogen, methyl, ethyl, methoxy, ethoxy, phenoxy, anilino, formylamino, acetylamino, propionylamino, trifluoroacetylamino, benzoylamino, methanesulphonylamino, ethanesulphonylamino, methoxycarbonylamino, ethoxycarbonylamino, methylaminocarbonylamino, ethylaminocarbonylamino, propylaminocarbonylamino, butylaminocarbonylamino, fluorine, chlorine, bromine, cyano, methoxycarbonyl, ethoxycarbonyl or nitro or R$^5$ and R$^6$ form a —CH=CH—CH=CH— bridge, R$^7$ represents hydrogen, methyl, ethyl, propyl, butyl, hydroxyethyl, hydroxypropyl, chloroethyl, cyanomethyl, cyanoethyl, cyanopropyl, methoxyethyl, ethoxyethyl, aminocarbonylethyl, methoxycarbonylethyl, ethoxycarbonylethyl, allyl, benzyl, phenethyl, methylbenzyl, phenyl, chlorophenyl, methylphenyl or methoxyphenyl, R$^8$ and R$^9$ independently of one another represent hydrogen, methyl, methoxy or chlorine, Z represents —CH$_2$—, —CH$_2$CH$_2$—, —C(CH$_3$)$_2$—, oxygen, NH, SO$_2$, —O(CH$_2$)$_2$—O—, —NHCO—, —NHCONH—, —NHCOCH=CHCONH—, —NHSO$_2$—, —CONHNHCO— or the group of the formula (II) where m=5 or the group of the formula (III) where Y=oxygen and denotes an anion.

4. A cationic 1,3,4-thiazole dyestuff according to claim 1 in,

R$^1$ and R$^2$ independently of one another represent methyl, ethyl, propyl, butyl, hydroxyethyl, hydroxypropyl, cyanoethyl, methoxyethyl, ethoxyethyl, methoxyphenyl or acetaminophenyl, and R$^2$ can also denote hydrogen or R$^1$ and R$^2$, together with the nitrogen atom in between, represent morpholino, R$^3$ represents methyl, ethyl, hydroxyethyl, hydroxypropyl, cyanoethyl or aminocarbonylethyl, R$^4$ represents methyl, methoxy, ethoxy or chlorine, R$^5$, R$^8$ and R$^9$ represent hydrogen, R$^6$ represents hydrogen, methyl, methoxy, formylamino, acetylamino, chlorine or cyano, R$^7$ represents hydrogen, methyl, hydroxyethyl, hydroxypropyl or cyanoethyl, Z represents NH, SO$_2$, —NHCO—, —NHCONH— or the group of the formula (III) where Y =oxygen and X$^-$ denotes an anion.

5. A cationic 1,3,4-thiadiazole dyestuff according to claim 1, in which,

R$^7$ represents hydrogen.

6. An anhydrobase, of the formula

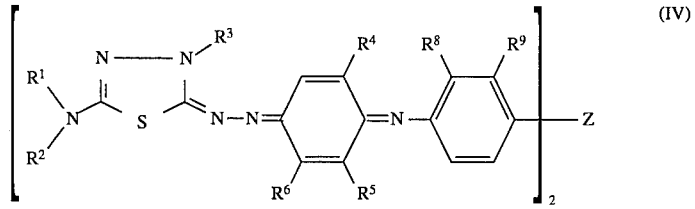

in which R$^1$ to R$^6$, R$^8$, R$^9$ and Z have the meaning given in claim 1.

7. A process for the preparation of cationic 1,3,4-thiadiazole dyestuffs of claim 1, in which diazotized 2-amino-1,3,4-thiadiazoles of the formula (V)

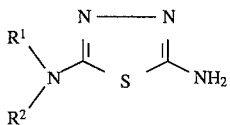

(V)

in which

R¹ and R² have the meaning given in claim 1, are coupled to diphenylamine derivatives of the formula (VI)

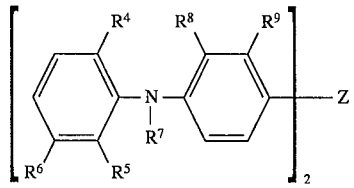

(VI)

in which

R⁴ to R⁹ and Z have the meaning given in claim 1, and the products are then quaternized with compounds of the formula (VII)

R³X    (VII)

in which

R³ has the meaning given in claim 1 and

X represents a group which corresponds to the non-charged anion X⁻ as given in claim 1.

8. A process for the preparation of cationic 1,3,4-thiadiazole dyestuffs of claim 1, in which dyestuffs of the formula (VIII)

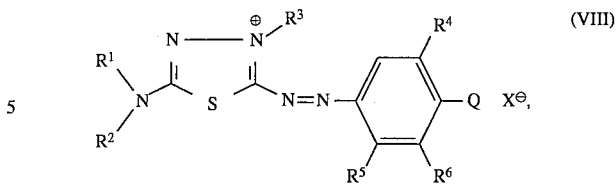

(VIII)

in which

R¹ to R⁶ and X have the meaning given in claim 1 and

Q represents halogen, hydroxyl, alkoxy, cycloalkoxy, aryloxy, amino, mono- or dialkylamino, acyloxy or acylamino, are reacted with amines of the formula (IX)

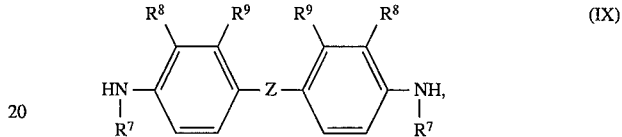

(IX)

in which

R⁷ to R⁹ and Z have the meaning given in claim 1.

9. Cationically dyeable fibres and fabrics, tannin-treated cellulose materials, paper, silk and leather, which comprise at least one cationic 1,3,4-thiadiazole dyestuff of claim 1.

10. A method of dyeing and printing cationically dyeable fibers and fabrics, tanin-treated cellulose material, paper, silk and leather which comprises applying thereto a cationic 1,3,4 dyestuff according to claim 1.

11. In a method for preparing writing liquids, stamping liquids, ball point pen pastes and ink jets or in preparing dichroic dyestuffs in polarizing films, the improvement which comprises using a cationic 1,3,4-thiadiazole dyestuff according to claim 1.

* * * * *